United States Patent [19]
Gilliland

[11] Patent Number: 6,091,568
[45] Date of Patent: Jul. 18, 2000

[54] LABYRINTH SEAL FOR MINIMIZING FLOW GRADIENTS LEADING TO AEROSOLING OF CONTAMINANTS EXTERNAL TO SPINDLES

[75] Inventor: Larry Joe Gilliland, Morgan Hill, Calif.

[73] Assignee: International Business Machines Corporation, Armonk, N.Y.

[21] Appl. No.: 09/024,164

[22] Filed: Feb. 17, 1998

[51] Int. Cl.[7] .............................. G11B 33/14; F02F 11/00
[52] U.S. Cl. .......................................... 360/97.02; 277/57
[58] Field of Search ..................... 360/97.02; 277/53–57, 277/96.1

[56] References Cited

U.S. PATENT DOCUMENTS

| | | |
|---|---|---|
| 4,162,077 | 7/1979 | Crow et al. . |
| 4,185,308 | 1/1980 | Fujioka ................................ 360/97.02 |
| 4,535,373 | 8/1985 | Schuh ................................... 360/97.02 |
| 4,884,820 | 12/1989 | Jackson et al. . |
| 5,031,922 | 7/1991 | Heydrich . |
| 5,035,589 | 7/1991 | Fraser, Jr. et al. . |
| 5,179,483 | 1/1993 | Lowe .................................... 360/97.02 |
| 5,295,028 | 3/1994 | Elsing ................................... 360/97.02 |
| 5,398,943 | 3/1995 | Shimizu ................................. 277/96.1 |

*Primary Examiner*—A. J. Heinz
*Attorney, Agent, or Firm*—Altera Law Group, LLC

[57] ABSTRACT

An improved labyrinth seal for minimizing flow gradients leading to aerosoling of contaminants external to the labyrinth seal. The labyrinth seal that uses a pattern of gradient elements formed on a labyrinth plate to direct flow away from the labyrinth seal itself. The gradient elements may be grooves for directing flow gradients away from the labyrinth seal. The grooves may be coined into surface and may have a curvature for drawing the flow gradient away from the labyrinth seal. The gradient elements may alternatively include an outgrowth for directing flow gradients away from the labyrinth seal. The gradient elements may be formed on the surface for directing flow gradients from the outer diameter to the inner diameter or for directing flow gradients from the inner diameter to the outer diameter. The gradient elements control the magnitude of the flow away from the labyrinth seal.

24 Claims, 5 Drawing Sheets

LABYRINTH SEAL FOR MINIMIZING FLOW GRADIENTS LEADING TO AEROSOLING OF CONTAMINANTS EXTERNAL TO SPINDLES

BACKGROUND OF THE INVENTION

1. Field of the Invention.

This invention relates in general to data storage devices, and more particularly to an improved labyrinth seal for minimizing flow gradients leading to the release of contaminants.

2. Description of Related Art.

In data storage devices, bits representing data are recorded on a storage medium. For example, in a disk drive, data bits are stored in circular tracks on rigid or flexible disks which are rotated at relatively high speeds. Bits are written or read by a read/write head which must be accurately positioned relative to the particular track which is being written or read. This means that the disks must rotate without wobble so that the radial displacement of the track with respect to the head position is eliminated or at least minimized.

To impart rotation to such disks it is known to arrange the electric drive motor axially near the disk and to connect the disk via suitable connecting elements to the motor shaft for rotation therewith. However, problems sometimes occur due to dirt particles when writing or reading out data. Dirt particles may emanate from the bearings and the winding. In particular, grease or dust particles can escape from the bearing system. The spindle motors in disk drives can thus experience aerosoling of grease/oil particles from the spindle bearings. This aerosoling can cause contamination of the head disk interface resulting in reduced near term or long term file reliability.

Contaminants have been confined by complicated and expensive seals. Rotary seals have for years been conventionally disposed between the rotating and stationary components of rotary machines to impede the leakage of a fluid medium therebetween. For example, labyrinth seals are typically implemented in the design of many spindles to prevent the occurrence of aerosoling.

Labyrinth seals are formed of a scaling surface or land on one component and a restrictive ring on an opposing component wherein the ring projects into close proximity with the land. A plurality of restrictive rings are commonly required in series to provide sufficient sealing. The term “seal” as used herein refers to a tight closure, albeit not a perfect closure as totally against the passage of air. Thus, the labyrinth seal can provide a seal using intricate paths that inhibit, if not prevent, the outward movement of contaminant particles from the motor. Such labyrinth seals make it possible to considerably reduce the risk of dirt particles passing from the inside of the motor into the area of the storage disk so that problems occurring when writing or reading out data is minimized.

Nevertheless, a natural flow gradient does develop between the rotating and stationary elements of the spindle/labyrinth seal. Small leaks within the spindle or pressure gradients in the file can assist in changing the flow gradient to cause leakage through the seal to the interior of the hard drive assembly. For example, 10–15% fallout for aerosoling under dynamic conditions has been observed.

It can be seen that there is for an improved labyrinth seal that minimizes flow gradients leading to aerosoling of contaminants external to spindles.

SUMMARY OF THE INVENTION

To overcome the limitations in the prior art described above, and to overcome other imitations that will become apparent upon reading and understanding the present specification, the present invention discloses an improved labyrinth seal for minimizing flow gradients leading to aerosoling of contaminants external to spindles.

The present invention solves the above-described problems by providing a labyrinth seal that uses a grooved pattern formed onto a labyrinth plate, e.g., by stamping, coining, etching, etc., to direct the flow of particles inwardly toward the shaft and away from the labyrinth seal itself.

A labyrinth plate in accordance with the principles of the present invention has a ring for interfacing with a land to form a labyrinth seal, the labyrinth plate further including gradient elements formed on the surface thereon for directing flow gradients away from the labyrinth seal.

Other embodiments of a system in accordance with the principles of the invention may include alternative or optional additional aspects. One such aspect of the present invention is that the gradient elements further comprises grooves for directing flow gradients away from the labyrinth seal.

Another aspect of the present invention is that the grooves are coined into the surface of the labyrinth plate.

Another aspect of the present invention is that the grooves have a curvature for drawing the flow gradient away from the labyrinth seal.

Another aspect of the present invention is that the gradient elements comprise an outgrowth for directing flow gradients away from the labyrinth seal.

Another aspect of the present invention is that the labyrinth plate further includes an inner diameter and an outer diameter, and wherein the gradient elements are formed on the surface for directing flow gradients from the outer diameter to the inner diameter.

Another aspect of the present invention is that the gradient elements control an amount of flow away from the labyrinth seal.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described specific examples of an apparatus in accordance with the invention.

BRIEF DESCRIPTION OF THE DRAWINGS

Referring now to the drawings in which like reference numbers represent corresponding parts throughout:

FIG. 1 illustrates an exploded view of a magnetic storage system according to the present invention;

FIG. 2 illustrates a simplified side view of the magnetic recording disk drive according to the present invention;

FIG. 3 illustrates a spindle motor for rotating disks in a disk drive at a constant speed;

FIG. 4 illustrates a labyrinth plate according to the present invention; and FIG. 5 illustrates a side sectional view of a labyrinth seal using a labyrinth plate according to the present invention.

DETAILED DESCRIPTION OF TIE INVENTION

In the following description of the exemplary embodiment, reference is made to the accompanying drawings which form a part hereof, and in which is shown by way of illustration the specific embodiment in which the invention may be practiced. It is to be understood that other embodiments may be utilized as structural changes may be made without departing from the scope of the present invention.

The present invention provides an improved labyrinth seal for minimizing flow gradients leading to aerosoling of contaminants external to spindle motors. The labyrinth seal uses a grooved patterned stamped or coined onto a labyrinth plate to direct the flow of particles inwardly toward the shaft and away from the labyrinth seal itself.

Figure 1:
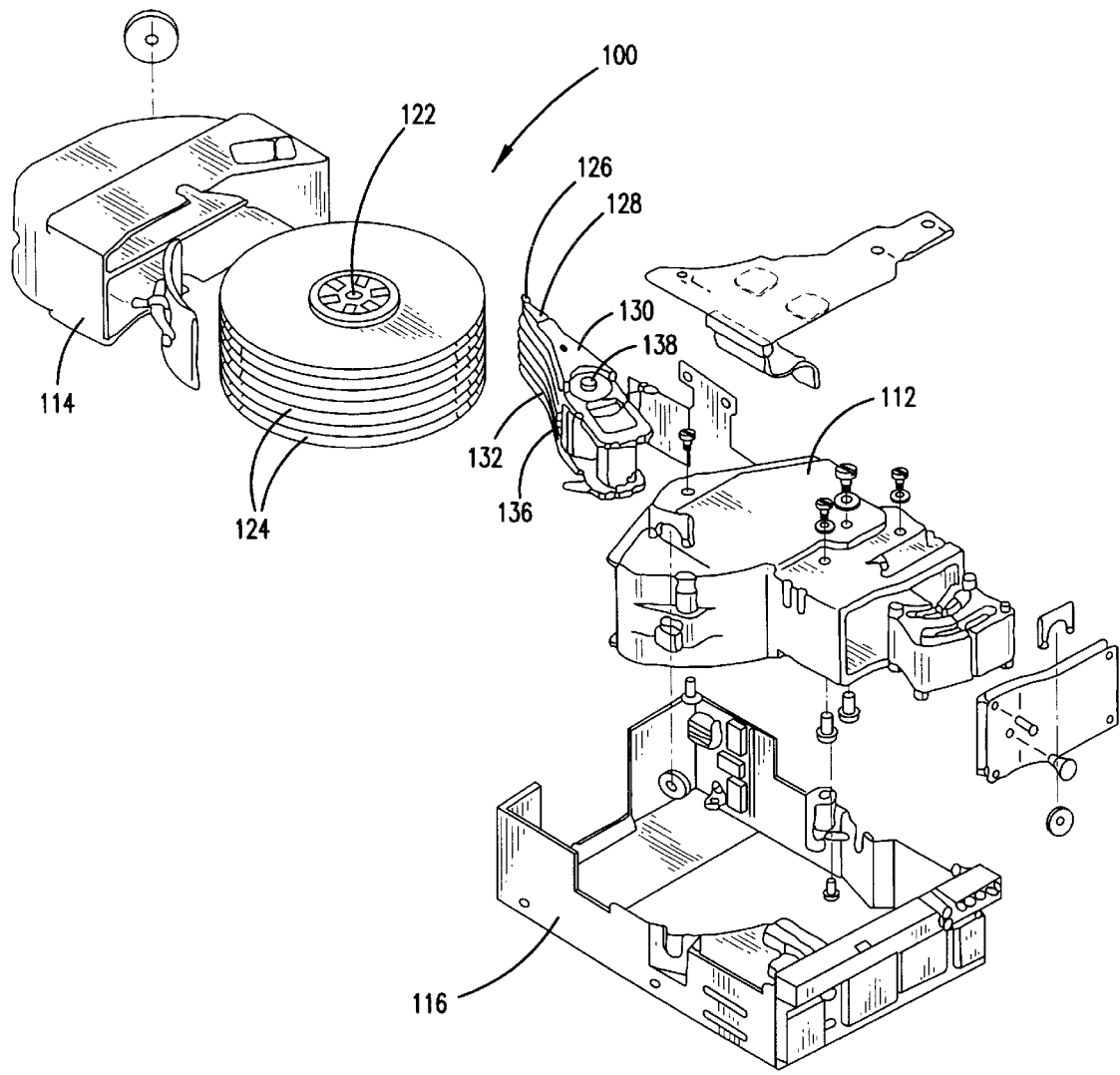

FIG. 1 illustrates an exploded view of a magnetic storage system 100. The disk drive 100 includes a housing 112 and a housing cover 114 which, after assembly, is mounted within a frame 116. Mounted within the housing is a spindle shaft 122. Rotatably attached to the spindle shaft 122 are a number of magnetic storage disks 124. In FIG. 1, multiple disks 124 are attached to the spindle shaft 122 in spaced apart relation. The disks 124 rotate on spindle shaft 122 which is powered by a motor (See FIG. 2). Information is written on or read from the disks 124 by heads or magnetic transducers (not shown) which are supported by sliders 126. Preferably, sliders 126 are coupled to the suspensions or load springs 128. The load springs 128 are attached to separate arms 130 on an E block or comb 132. The E block or comb 132 is attached at one end of an actuator arm assembly 136. The actuator arm assembly 136 is rotatably attached within the housing 112 on an actuator shaft 138. The rotary actuator assembly 136 moves the integrated transducer/suspension assembly in accordance with the present invention in an arcuate path across the surface of the storage disk 124. However, those skilled in the art will recognize that the invention is not meant to be limited to use in the particular storage device described above.

Figure 2:
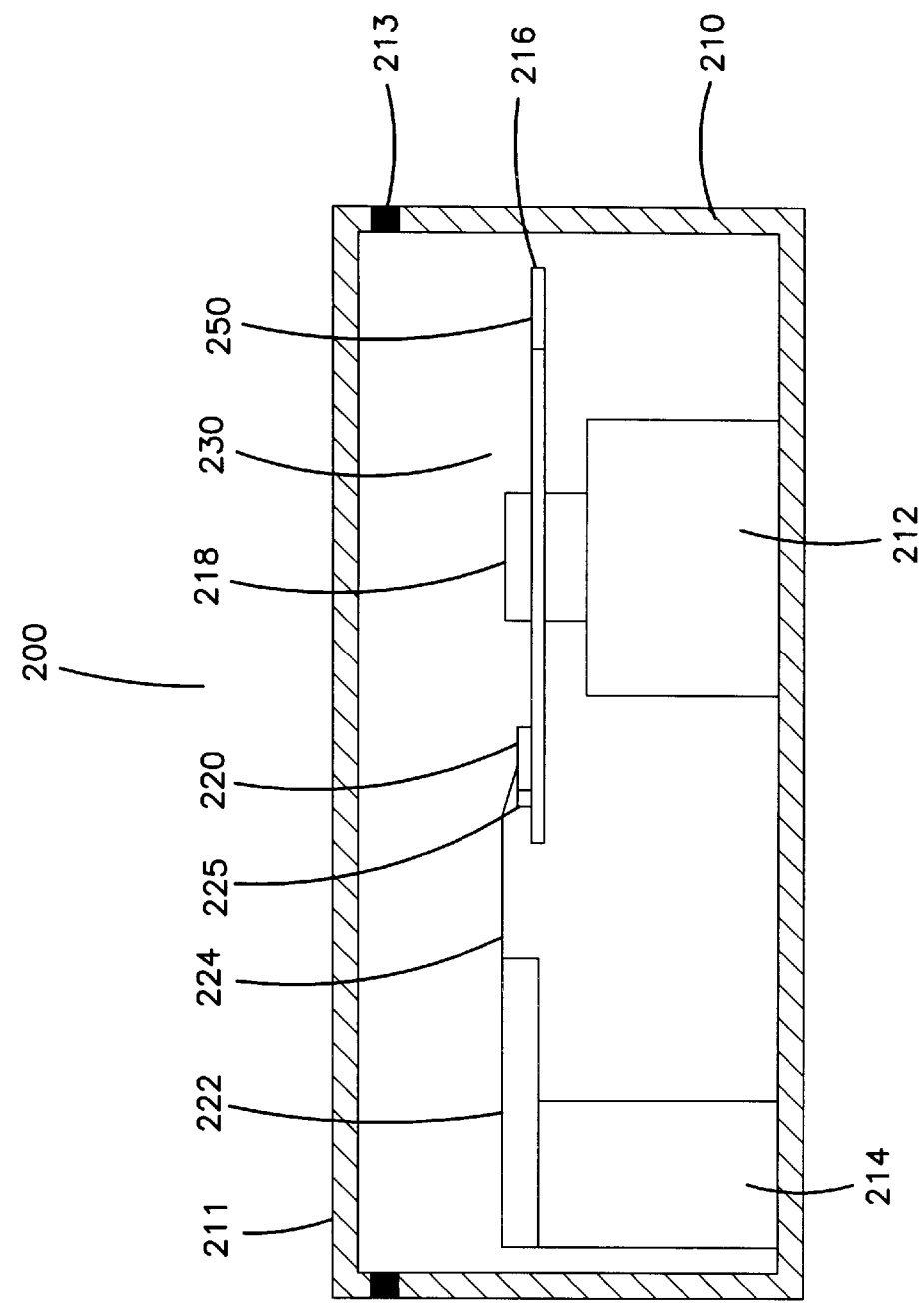

FIG. 2 illustrates a simplified side view of the magnetic recording disk drive 200 according to the present invention. The disk drive 200 includes a base 210 to which are secured a spindle motor 212, an actuator 214, and a cover 211. The base 210 and cover 211 provide a substantially scaled housing for the disk drive. Typically, there is a gasket 213 located between base 210 and cover 211 and a small breather port (not shown) for equalizing pressure between the interior of the disk drive and the outside environment.

As describe with reference to FIG. 1, at least one magnetic recording disk 216 is provided in a generally contaminant-free environment 230. As shown in FIG. 2, the magnetic recording disk 216 may be connected to drive motor 212 by means of hub 218 to which it is attached for rotation by the drive motor 212. A thin lubricant film 250 is maintained on the surface of disk 216. A read/write head or transducer 225 is formed on the trailing end of a carrier, such as an air-bearing slider 220. The slider 220 is connected to the actuator 214 by means of a rigid arm 222 and a suspension 224. The suspension 224 provides a biasing force that urges the slider 220 onto the surface of the recording disk 216.

During operation of the disk drive, the drive motor 212 rotates the disk 216 at a constant speed, and the actuator 214, which is typically a linear or rotary voice coil motor (VCM), moves the slider 220 generally radially across the surface of the disk 216 so that the read/write head may access different data tracks on disk 216. As is well known in the art the read element reads not only data but also servo positioning information prerecorded on the disk, typically in servo sectors angularly spaced around the disk and located in the data tracks. The servo information is read and processed by a digital control system to control the amount of current sent to the VCM. In this manner the head is maintained on track during read and write operations and accurately moved across the tracks to read and write on all the tracks.

The above description of the magnetic recording disk drive incorporating the present invention, and the accompanying FIGS. 1 and 2, are for representation purposes only. Disk drives may contain a large number of disks and actuators, and each actuator may support a number of sliders.

Figure 3:
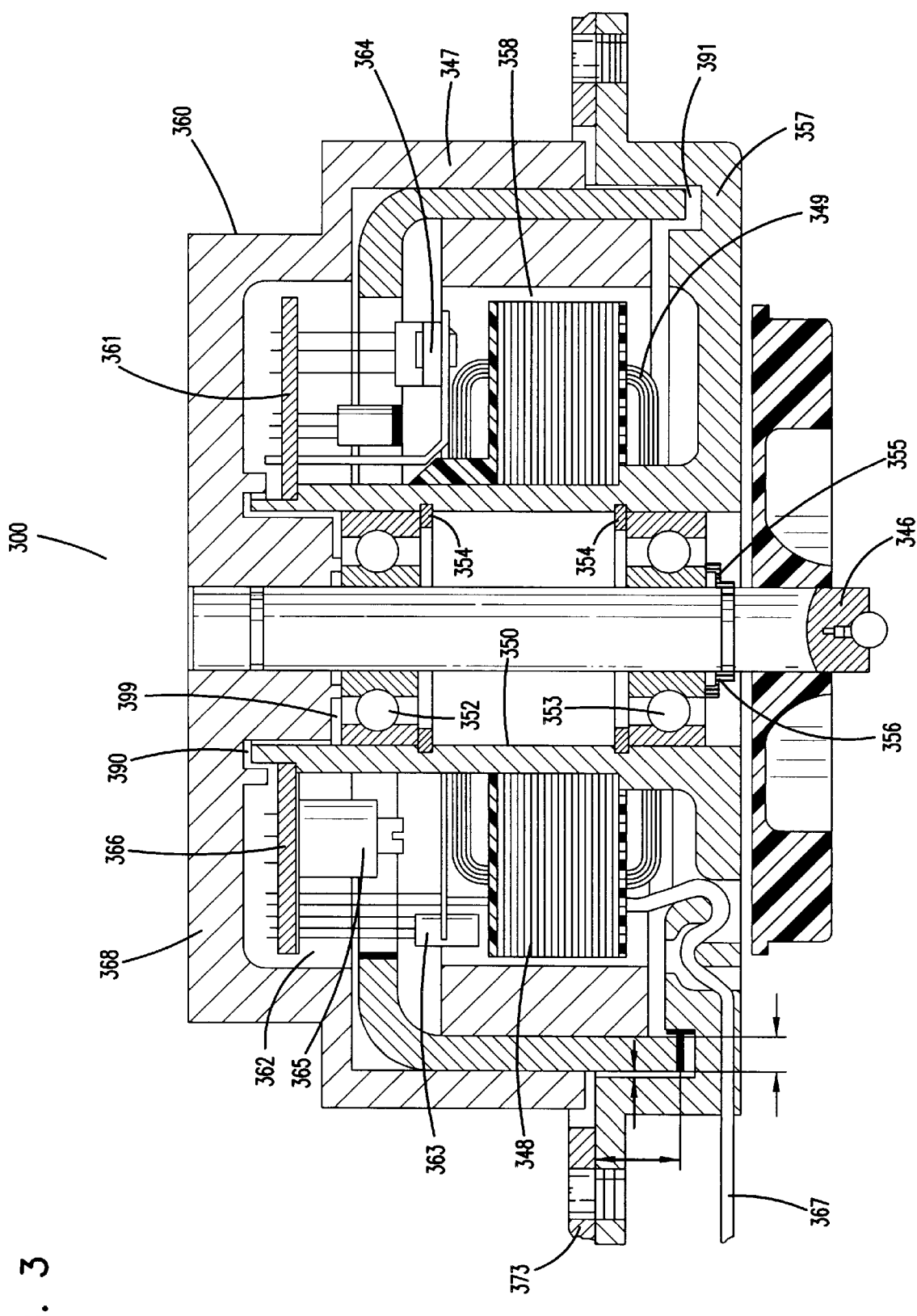

FIG. 3 illustrates one example of a spindle motor 300 for rotating disks in a disk drive at a constant speed. The spindle motor 300 may include a brushless motor with a rotor casing 347 fixed to a shaft 346 and concentric thereto. A group of stator plates 348 carrying a stator winding 349 forms part of the stator of spindle motor 300. The stator plates 348 surround a bearing tube 350. The shaft 346 is mounted in the bearing tube 350 with the aid of two bearing 352, 353, which are held in place by spaced retaining rings 354. A cup spring 355 bears against the bottom of bearing 353 and a retaining ring 356 located on shaft 346 so that bearings 352, 353 are axially braced relative to one another. Although FIG. 3 illustrates ball bearings, alternative embodiments may include various other types of bearings such as fluid hydrodynamic bearings. Together with an assembly flange 357, the bearing tube 350 forms a one-piece die casting. As an alternative, the bearing tube 350 can be force fitted into a hub 360 joined to the flange 357.

Rotor casing 347 not only surrounds the group of stator plates 348 and forms a cylindrical air gap 358, but on the side remote from the assembly flange 357 is axially extended, providing a hub 360. The hub 360 is used for mounting and driving one or more rigid storage disks (not shown) having a central bore, whose diameter corresponds to the external diameter of the hub 360. A printed circuit board 361 is housed in free space 362 within the hub 360. The circuit board 361 is circular and is connected to the central support 351. The circuit board 361 carries the drive electronics and a speed control circuit, which includes, among other things, a Hall IC 363 serving as a rotation position detector, output stage transistors 364 and a potentiometer 365. The soldered joints of the circuit components of the drive electronics and the speed control circuit, which are preferably produced in one operation, for example, in a dip soldering process, are indicated at 366. The potentiometer 365 can be used, for example, for setting different operating points or for compensating component tolerances. A line 367 leading to the printed circuit board 361 is connected to a DC voltage source. The side of the circuit board 361 carrying the soldering joints 365 faces the base 368 of the rotor casing 347.

The assembly flange 357 makes it possible to fit the spindle motor 300 to a partition 373 within the drive body. Such partition 373 separates the ultra-clean area for receiving the rigid storage disks from the remainder of the interior of the apparatus. Any dirt particles, grease vapors or the like, which may escape from the bearing 352 are held back by labyrinth seals 390, 391.

Labyrinth seals 390, 391 are formed by stationary and rotary parts, which coaxially inter-engage within the driving mechanism. A labyrinth 390 is actually a narrow gap forming a tight passage. Although no material is used to form an actual packing or gasket of a seal, the overall affect of the labyrinth seal on contaminant particles is that of a barrier because of the structural containment of the particles by their being restricted, for example, at plate 399 by the maze of the labyrinth seal 390.

While FIG. 3 illustrates a ball bearing spindle motor, those skilled in the art will recognize that a labyrinth seal may be used to act as a barrier to contaminants from one area to another, e.g., a labyrinth seal may also be used in a fluid dynamic bearing motor.

Figure 4:
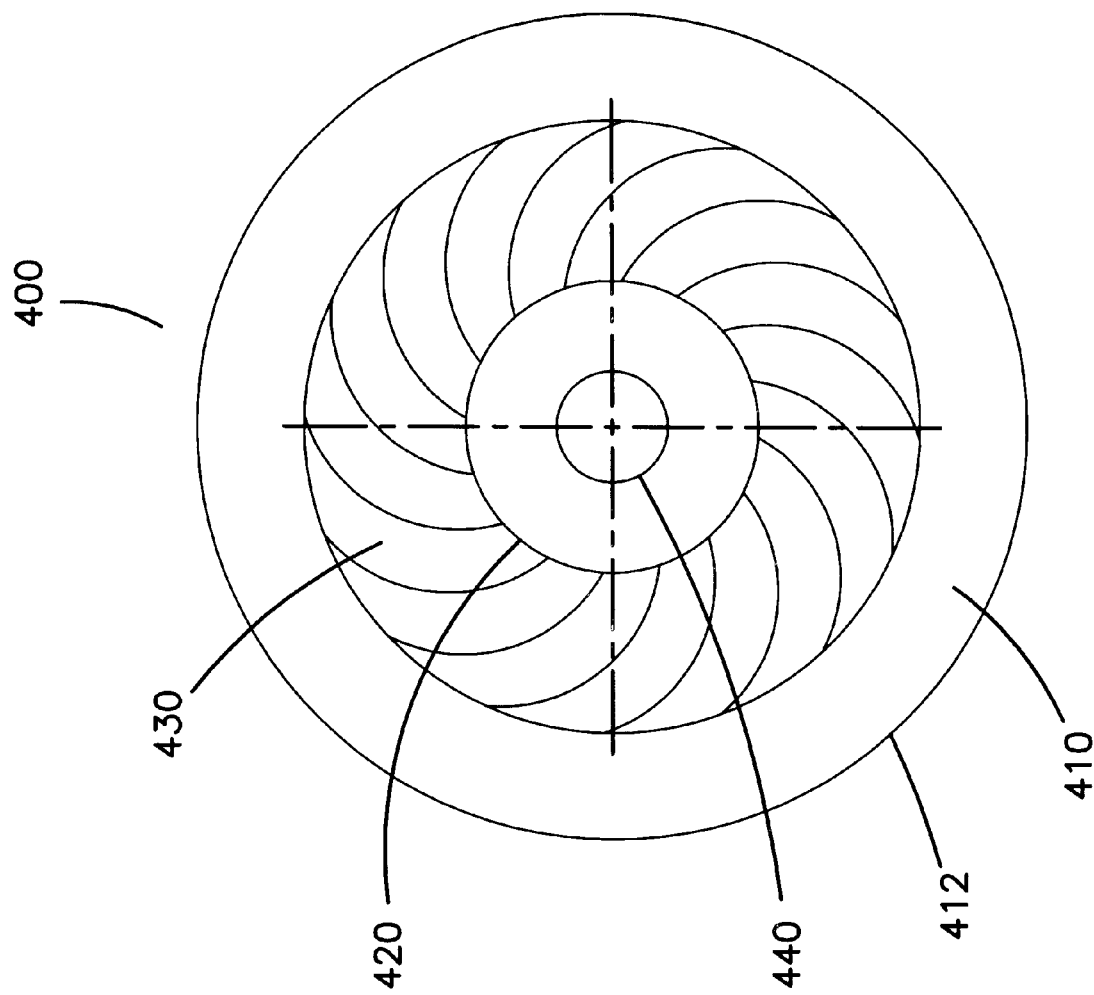

FIG. 4 illustrates a labyrinth plate 400 according to the present invention. The labyrinth plate 400 includes an upwardly extending flange or restrictive ring 410 at the outer diameter 412 of the labyrinth plate 400. From the inner diameter 420. a pattern 430, e.g., a spiral-grooved pattern, is formed on the surface of the labyrinth plate 400 to direct flow away from the ring 410.

An air/fluid bearing spindle may use the pattern 430 on one of the bearing surfaces, e.g., the labyrinth plate 400 as shown in FIG. 4, to generate a specific direction and amount of flow between the stationary and rotating elements of the bearing. Such a pattern in the labyrinth seal 400 maintains a minimal or net zero flow past the seal. The sealing effect is a natural result of one stationary/one rotating surface. The groove design may be coined or stamped into the surface of the labyrinth plate 400 with minimal cost or complexity.

Figure 5:
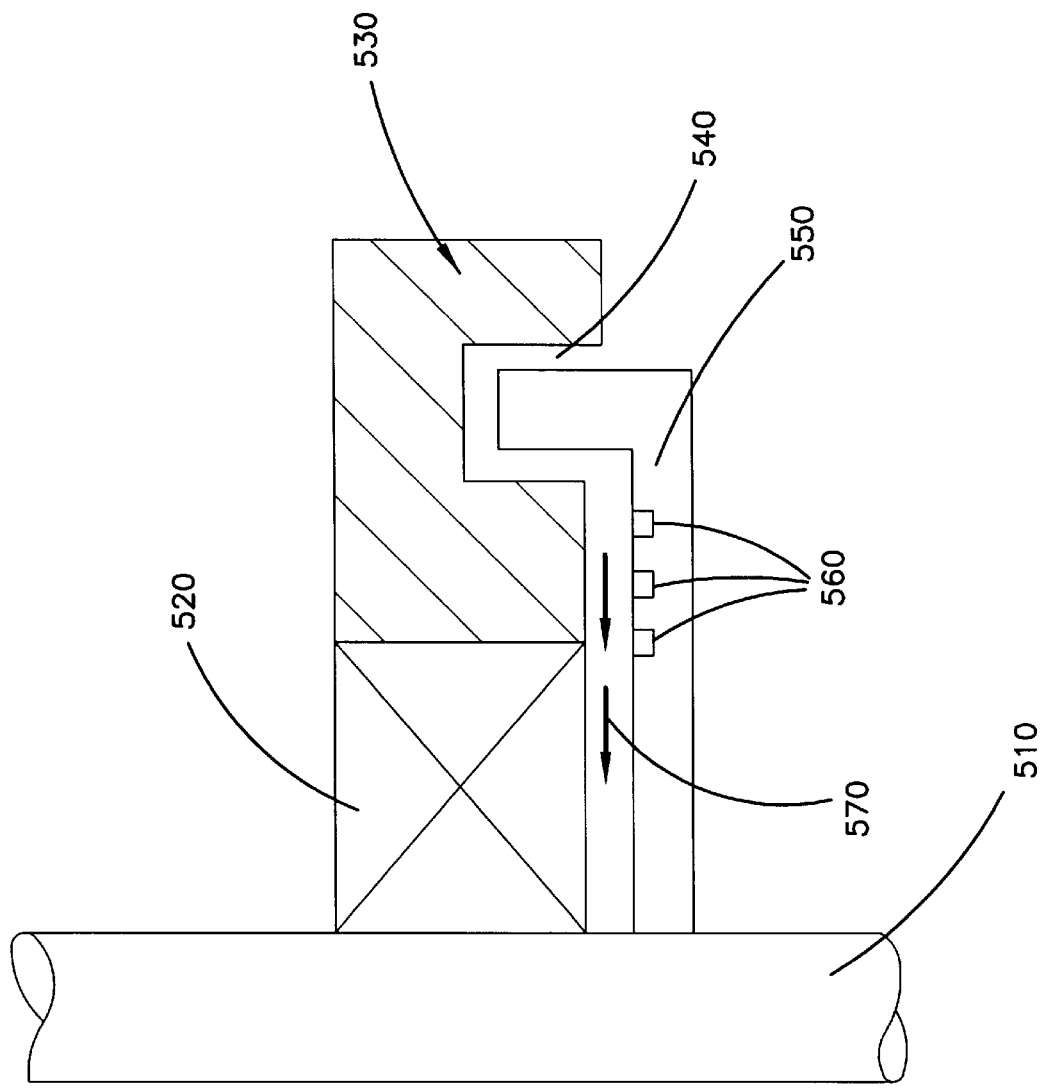

FIG. 5 illustrates a side sectional view of a labyrinth seal 500 according to the present invention. In FIG. 5, a stationary shaft 510 has a bearing 520 attached thereto. The bearing 520 is seated against shaft 510 and engages a bearing bushing 530. Bearing bushing 530 includes a recessed area or land 540 forming a first part of the labyrinth seal. The labyrinth plate 550 is attached to stationary shaft 510. As the bearing bushing 530 rotates about the bearing 520, the patterns 560 in the labyrinth plate 550 generate an inward flow 570 to effect a minimal or net zero flow past the seal by creating a specific direction and amount of flow between the stationary plate 550 and rotating bushing 530.

Those skilled in the art will recognize that the invention is not meant to be limited to the patterns illustrated in FIG. 4. Preferably, the patterns or gradient elements are grooves 430 formed on the plates 400 for directing flow gradients away from the labyrinth seal at the ring 410. However, those skilled in the art will recognize that the gradient elements may alternatively comprise an outgrowth for directing flow gradients away from the labyrinth seal. With regard to grooves, the grooves may be coined or stamped into surface and may have a curvature, as shown in FIG. 4, for drawing the flow gradient away from the labyrinth seal. The gradient elements control the magnitude of the flow away from the labyrinth seal. The gradient elements may also be designed for directing flow gradients from the outer diameter to the inner diameter or for directing flow gradients from the inner diameter to the outer diameter depending upon the direction of rotation and the angle of the gradient pattern.

The foregoing description of the exemplary embodiment of the invention has been presented for the purposes of illustration and description. It is not intended to be exhaustive or to limit the invention to the precise form disclosed. Many modifications and variations are possible in light of the above teaching. It is intended that the scope of the invention be limited not with this detailed description, but rather by the claims appended hereto.

What is claimed is:

1. A labyrinth plate having a ring for interfacing with a land to form a labyrinth seal, the labyrinth plate further including gradient elements formed on the surface of the plate separate from the seal for directing flow gradients away from the labyrinth seal.

2. The labyrinth plate of claim 1 wherein the gradient elements further comprises grooves for directing flow gradients away from the labyrinth seal.

3. The labyrinth plate of claim 2 wherein the grooves are coined into the surface.

4. The labyrinth plate of claim 2 wherein the grooves have a curvature for drawing the flow gradient away from the labyrinth seal.

5. The labyrinth plate of claim 1 wherein the gradient elements comprise an outgrowth for directing flow gradients away from the labyrinth seal.

6. The labyrinth plate of claim 1 further comprises an inner diameter and an outer diameter, and wherein the gradient elements are formed on the surface for directing flow gradients from the outer diameter to the inner diameter.

7. The labyrinth plate of claim 1 further comprises an inner diameter and an outer diameter, and wherein the gradient elements are formed on the surface for directing flow gradients from the inner diameter to the outer diameter.

8. The labyrinth plate of claim 1 wherein the gradient elements control an amount of flow away from the labyrinth seal.

9. A drive mechanism for a data storage device, comprising:
   a shaft;
   a rotor; and
   a bearing system, rotatably coupling the rotor and shaft, the bearing system including a stationary and a rotating element, wherein the stationary element comprises a labyrinth plate having a ring for interfacing with a land formed in the rotating element to form a labyrinth seal, the labyrinth plate further including gradient elements formed separate from the seal on the surface of the plate for directing flow gradients away from the labyrinth seal.

10. The drive mechanism of claim 9 wherein the gradient elements further comprises grooves for directing flow gradients away from the labyrinth seal.

11. The drive mechanism of claim 10 wherein the grooves are coined into surface.

12. The drive mechanism of claim 10 wherein the grooves have a curvature for drawing the flow gradient away from the labyrinth seal.

13. The drive mechanism of claim 9 wherein the gradient elements comprise an outgrowth for directing flow gradients away from the labyrinth seal.

14. The drive mechanism of claim 9 further comprises an inner diameter and an outer diameter and wherein the gradient elements are formed on the surface for directing flow gradients from the outer diameter to the inner diameter.

15. The drive mechanism of claim 9 further comprises an inner diameter and an outer diameter, and wherein the gradient elements are formed on the surface for directing flow gradients from the inner diameter to the outer diameter.

16. The drive mechanism of claim 9 wherein the gradient elements control an amount of flow away from the labyrinth seal.

17. A disk storage device, comprising:
   a contaminant-free environment accommodating at least one rotary storage disk;
   an actuator assembly having a sensor attached at a distal end of at least one suspension arm for reading and writing data on the at least one rotary storage disk; and
   a motor for rotating the at least one rotary storage disk, the motor comprising a bearing system including a stationary and a rotating element, wherein the stationary element comprises a labyrinth plate having a ring for interfacing with a land formed in the rotating element to form a labyrinth seal, the labyrinth plate further including gradient elements formed separate from the seal on the surface of the plate for directing flow gradients away from the labyrinth seal.

18. The disk storage device of claim 17 wherein the gradient elements further comprises grooves for directing flow gradients away from the labyrinth seal.

19. The disk storage device of claim 18 wherein the grooves are coined into surface.

20. The disk storage device of claim 18 wherein the grooves have a curvature for drawing the flow gradient away from the labyrinth seal.

21. The disk storage device of claim 17 wherein the gradient elements comprise an outgrowth for directing flow gradients away from the labyrinth seal.

22. The disk storage device of claim 17 further comprises an inner diameter and an outer diameter, and wherein the gradient elements are formed on the surface for directing flow gradients from the outer diameter to the inner diameter.

23. The disk storage device of claim 17 further comprises an inner diameter and an outer diameter, and wherein the gradient elements are formed on the surface for directing flow gradients from the inner diameter to the outer diameter.

24. The disk storage device of claim 17 wherein the gradient elements control an amount of flow away from the labyrinth seal.

* * * * *

UNITED STATES PATENT AND TRADEMARK OFFICE
CERTIFICATE OF CORRECTION

PATENT NO.    : 6,091,568
DATED         : July 18, 2000
INVENTOR(S)   : Gilliland It is certified that error appears in the above-identified patent and that said Letters Patent is hereby corrected as shown below:

Column 1,
Line 40, replace "scaling" with -- sealing --;
Line 67, replace "imitations" with -- limitations --;

Column 3,
Line 39, replace "scaled" with -- sealed --;
Line 45, replace "describe" with -- described --;

Column 6,
Line 46, add -- , -- after "outer diameter"
Line 61, delete "the";
Line 62, delete "the" after "rotating";

Column 7,
Line 5, replace "comprises" with -- comprise --.

Signed and Sealed this

Twenty-fifth Day of June, 2002

Attest:

JAMES E. ROGAN
Attesting Officer          Director of the United States Patent and Trademark Office